United States Patent
Bassan et al.

(10) Patent No.: US 11,820,433 B2
(45) Date of Patent: Nov. 21, 2023

(54) MOTOR-VEHICLE LATTICE FRAME

(71) Applicant: C.R.F. SOCIETÀ CONSORTILE PER AZIONI, Turin (IT)

(72) Inventors: Daniele Bassan, Orbassano (IT); Silvano Sandri, Orbassano (IT); Michele Longo, Turin (IT); Stefano Paradiso, Turin (IT); Carlo Carcioffi, Modena (IT)

(73) Assignee: C.R.F. SOCIETÀ CONSORTILE PER AZIONI, Turin (IT)

( * ) Notice: Subject to any disclaimer, the term of this patent is extended or adjusted under 35 U.S.C. 154(b) by 11 days.

(21) Appl. No.: 17/595,732

(22) PCT Filed: Jul. 8, 2020

(86) PCT No.: PCT/IB2020/056409
§ 371 (c)(1),
(2) Date: Nov. 23, 2021

(87) PCT Pub. No.: WO2021/033039
PCT Pub. Date: Feb. 25, 2021

(65) Prior Publication Data
US 2022/0250692 A1    Aug. 11, 2022

(30) Foreign Application Priority Data
Aug. 22, 2019  (EP) .................................... 19193174

(51) Int. Cl.
*B62D 23/00* (2006.01)
*B62D 27/02* (2006.01)
(Continued)

(52) U.S. Cl.
CPC ............ *B62D 23/005* (2013.01); *B33Y 80/00* (2014.12); *B62D 21/00* (2013.01); *B62D 27/023* (2013.01); *B62D 27/026* (2013.01)

(58) Field of Classification Search
CPC ..... B62D 23/005; B62D 27/023; B33Y 80/00
(Continued)

(56) References Cited

U.S. PATENT DOCUMENTS 4,355,844 A    10/1982  Mazzarelli
5,332,281 A *   7/1994  Janotik ................. B62D 21/02
                                                      52/696

(Continued)

FOREIGN PATENT DOCUMENTS

CN       100482516 C  *  4/2009  ............ B62D 21/02
DE     10 2012 112313 A1    6/2014
(Continued)

OTHER PUBLICATIONS

International Search Report and Written Opinion of International Application No. PCT/IB2020/056409, dated Oct. 9, 2020, 13 pages.

*Primary Examiner* — Dennis H Pedder
(74) *Attorney, Agent, or Firm* — Heslin Rothenber Farley & Mesiti P.C.; Victor A. Cardona, Esq.

(57) ABSTRACT

A motor-vehicle lattice frame that includes a plurality of structural nodes each having a central body and at least one hollow arm protruding from the central body. The lattice frame also includes a plurality of beam elements connected to each other by means of the hollow protruding arms. The structural nodes are made by an additive manufacturing technique and at least one arm of one of the nodes has an end portion opposite to said central body having a channel shape with an open cavity both at a front end of the arm and along one side of the arm.

6 Claims, 13 Drawing Sheets

(51) Int. Cl.
*B33Y 80/00* (2015.01)
*B62D 21/00* (2006.01)

(58) Field of Classification Search
USPC .............................. 296/205, 29, 30
See application file for complete search history.

(56) References Cited

U.S. PATENT DOCUMENTS

| | | | | |
|---|---|---|---|---|
| 5,549,352 | A * | 8/1996 | Janotik | B62D 29/008 |
| | | | | 296/205 |
| 7,765,699 | B2 * | 8/2010 | Corcoran | B62D 33/06 |
| | | | | 29/897 |
| 8,833,832 | B2 * | 9/2014 | Whipps | B62D 27/023 |
| | | | | 296/203.02 |
| 2011/0194889 | A1 | 8/2011 | Allred, III | |
| 2017/0355003 | A1 | 12/2017 | Tenhouten | |
| 2019/0048912 | A1 | 2/2019 | Czinger | |

FOREIGN PATENT DOCUMENTS

| | | | | |
|---|---|---|---|---|
| DE | 20 2017 105474 U1 | 12/2018 | | |
| EP | 1463602 B1 * | 2/2007 | ........... | B23K 11/002 |
| EP | 2 236 395 A1 | 10/2010 | | |
| EP | 3148784 A1 | 4/2017 | | |
| GB | 2001915 A * | 2/1979 | ............. | B62D 25/02 |
| JP | 2001520601 A * | 10/2001 | | |
| WO | WO-9830431 A1 * | 7/1998 | ........... | B62D 23/005 |
| WO | WO 2016003982 A1 | 1/2016 | | |

\* cited by examiner

FIG. 13E

MOTOR-VEHICLE LATTICE FRAME

CROSS REFERENCE TO RELATED APPLICATIONS

This application is a national stage filing under section 371 of International Application No. PCT/IB2020/056409, filed on Jul. 8, 2020, published in English on Feb. 25, 2021 as WO 2021/033039 and which claims priority from European Patent Application No. 19193174.0 filed on Aug. 22, 2019, the entire disclosure of these applications being hereby incorporated herein by reference.

FIELD OF THE INVENTION

The present invention relates in general to motor-vehicle frames and more specifically to a motor-vehicle lattice frame comprising:
- a plurality of structural nodes each having a central body and at least one hollow arm protruding from the central body, and
- a plurality of beam elements connected to each other by means of the protruding arms.

STATE OF THE ART AND OBJECT OF THE INVENTION

The document U.S. Pat. No. 4,355,844 A illustrates a motor-vehicle frame having the characteristics indicated above.

The present invention is based on the requirement to provide a motor-vehicle lattice frame which has a rapid and low-cost production and assembly method, without thereby being less effective in performing the functions for which it is designed.

An additional object of the invention is to provide a motor-vehicle lattice frame consisting of components suitable for producing different frame geometries.

SUMMARY OF THE INVENTION

In order to achieve one or more of the aforesaid objects, the invention relates to a motor-vehicle lattice frame of the type indicated at the beginning of the present description and also characterized in that said structural nodes are made by an additive manufacturing technique, and at least one arm of one of the nodes has an end portion opposite to the central body having a channel conformation with an open cavity both at a front end of the arm and along one side of the arm.

Preferably, said end portion having a channel-shaped configuration includes two side flanges each extending along one side of the arm, at a respective side of said open cavity, so that said at least one arm has an $\Omega$ cross-section at said end portion.

The beam element connected to said at least one arm with an $\Omega$ cross-section can include two end flanges arranged in abutment against said side flanges, so as to define a free space between the inner surface of the hollow arm and the beam element inserted into said channel-shaped end portion.

According to a further preferred characteristic, said beam element is connected to said at least one arm with a channel-shaped end portion, only by the aid of an adhesive layer.

DETAILED DESCRIPTION OF PREFERRED EMBODIMENTS OF THE INVENTION

Further characteristics and advantages of the invention will become apparent from the description that follows with reference to the attached drawings, provided purely by way of non-limiting example, wherein.

In the following description various specific details are illustrated aimed at a thorough understanding of the embodiments. The embodiments can be implemented without one or more of the specific details, or with other methods, components, materials, etc. In other cases, known structures, materials, or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

In the present description and in the claims that follow, the term "additive manufacturing" means a method, known in the art, in which an energy source is used, such as a laser or plasma beam, to selectively melt layers of metal or plastic powders or wires, of various sizes, so as to form—layer after layer—a metal or plastic component.

For example, a device for making components using additive manufacturing is known from the document EP 3148784 A1. Of course, the technology illustrated in this document is just an example, since different additive manufacturing technologies can be applied to make the motor-vehicle lattice frame according to the present invention.

The attached drawings show preferred embodiments of a motor-vehicle lattice frame T according to the present invention. The present invention may relate to any type of motor-vehicle frame, for example, a frame of a motor-vehicle structure, or a frame for supporting a component installed on the motor-vehicle.

Figure 1:
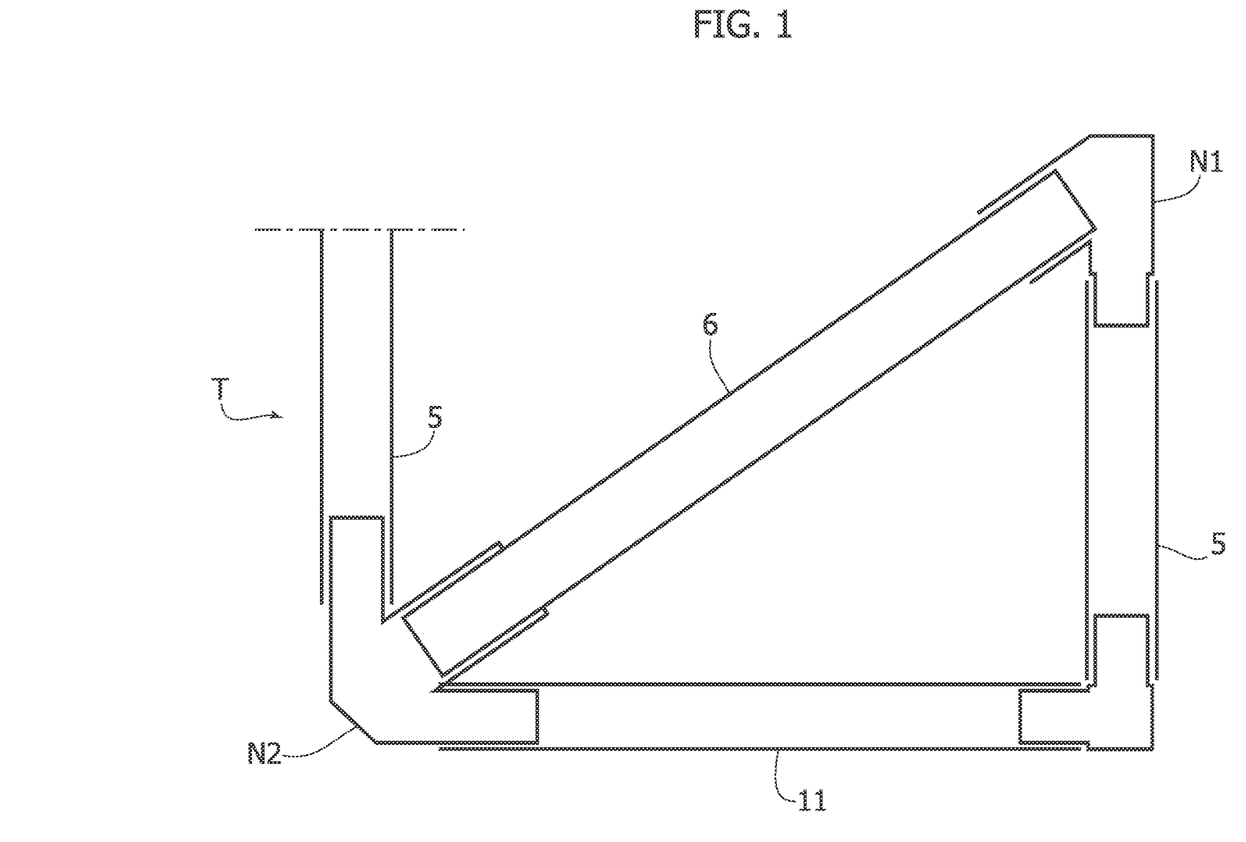
FIG. 1 is a schematic view of a motor-vehicle lattice frame according to the present invention.

As shown in particular in the schematic view of FIG. 1, the motor-vehicle lattice frame T comprises a plurality of structural nodes N1, N2 each having a central body 1 from which at least two hollow arms 2, 3, 4, 30 protrude. The lattice frame T also includes a multitude of beam elements 5, 6, 11, 27 which are connected to each other by means of the protruding arms 2, 3, 4, 30. The beam elements connected to the respective arms of the nodes can have cross-sections with different shapes (for example, quadrangular or circular).

In the following description, various embodiments of the structural nodes N1, N2 will be described in detail to provide a lattice frame T of a motor-vehicle according to the present invention.

According to an essential characteristic of the present invention, the structural nodes N1, N2 of the lattice frame T are obtained with a construction technique of "additive manufacturing". By producing the structural nodes by means of an additive manufacturing technique it is possible to obtain numerous advantages with respect to the traditional production methods, among which, preparing components with complex geometries without incurring penalties in terms of time or cost with respect to the production of components with more simple geometries. In the case of the invention, the structural nodes can be made of metal or plastic material, while the beam elements connected to each other by means of the structural nodes, can be made, for example, of aluminium alloy.

Figure 2:
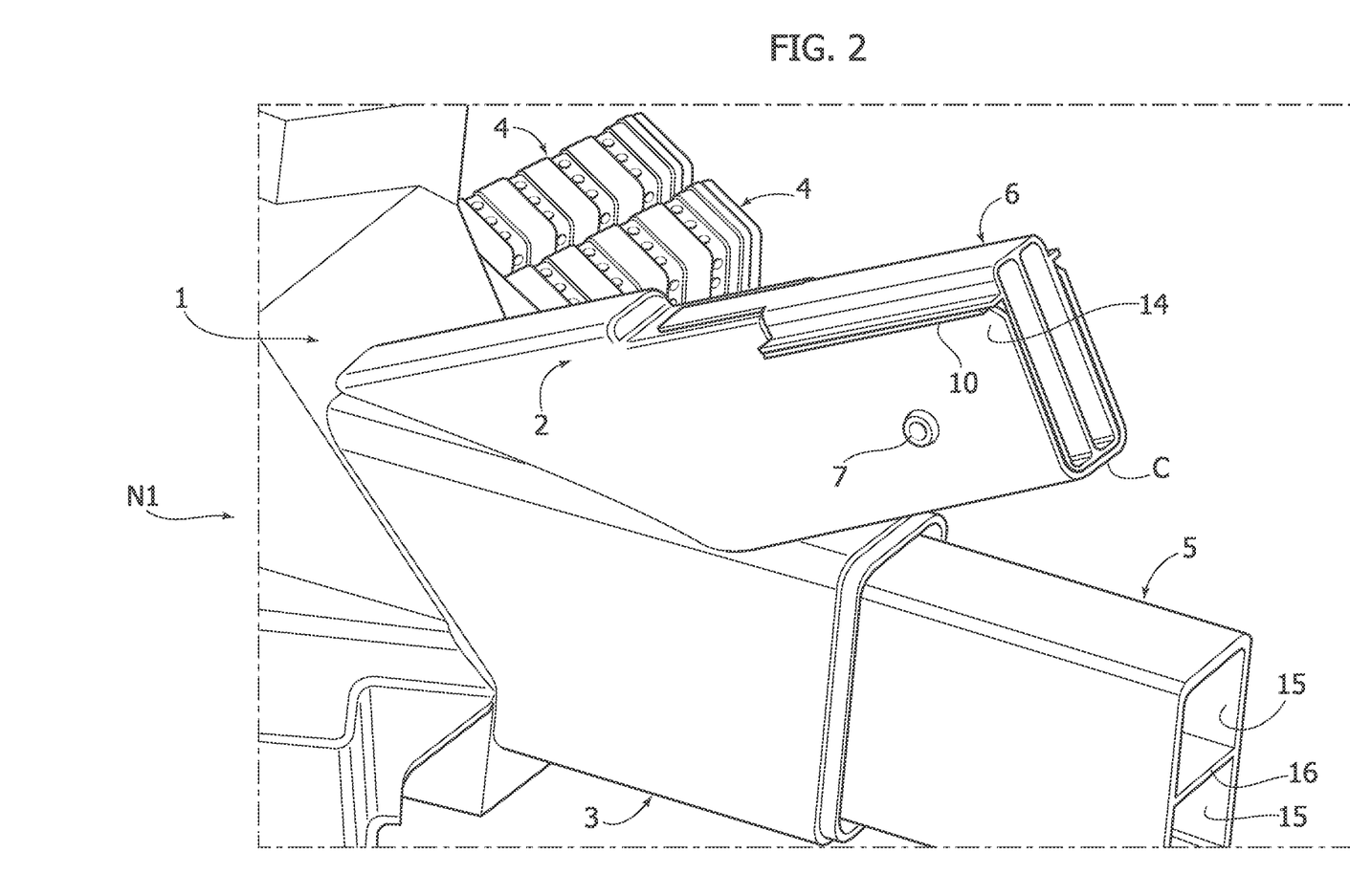
FIG. 2 is a perspective view illustrating some components of a motor-vehicle lattice frame according to a first embodiment.

FIG. 2 shows a perspective view of a first embodiment of a motor-vehicle structural node N1. As indicated above, each structural node, which together with the beam elements composes the lattice frame T, includes a central body 1 and a plurality of hollow arms 2, 3, 4, 30 protruding from the central body 1. The hollow arms can be arranged around the central body according to multiple configurations so as to achieve the required geometry of the frame.

Figure 3:
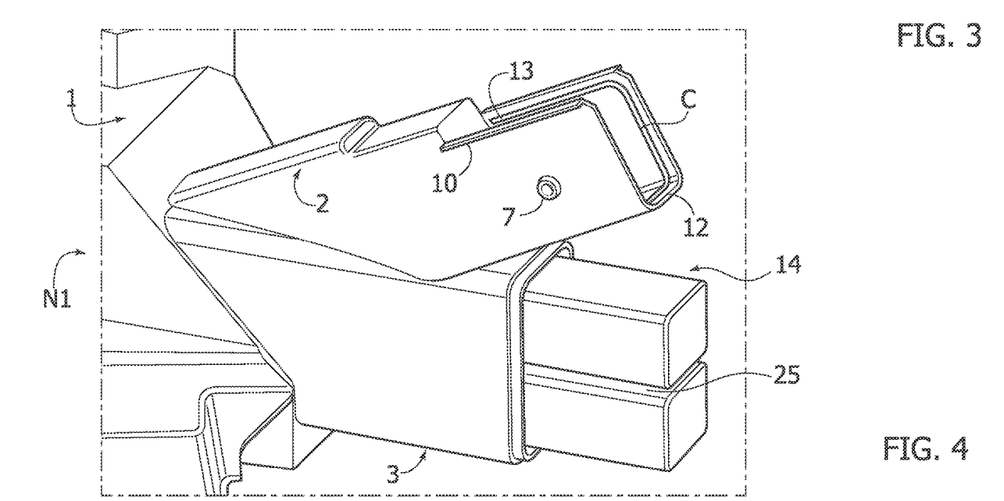
FIGS. 3-5 are perspective views showing some details illustrated in FIG. 2.
Figure 4:
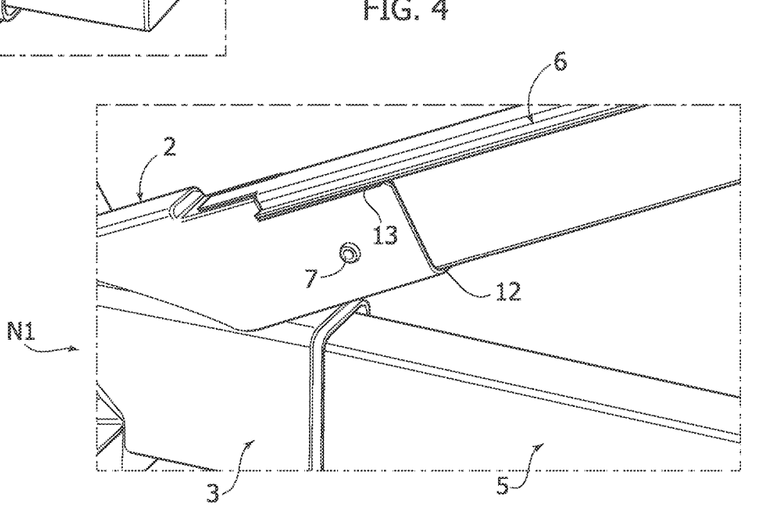

According to an important characteristic of the frame T according to the invention, at least one arm 2 of one of the nodes has an end portion opposite the central body 1 which includes a C-channel shape with an open cavity both at a front end 12 of the arm 2 and along a side 13 of the arm 2 (FIGS. 2-4).

The C-channel conformation with an open cavity is arranged to receive a respective beam element 6 therein, intended to be connected at one of its opposite ends to another structural node.

The beam element 6 is connected to the arm 2 only by the aid of an adhesive layer. Still with reference to FIGS. 2-4, in order to produce the bonding between the arm 2 and the beam element 6, the C-channel shaped end portion includes two opposite side walls 14 on which at least one opening 7 is made to allow the passage of the adhesive layer. Of course, the configuration of the openings 7 for introducing the adhesive material can widely vary with respect to what is illustrated in the attached drawings, without thereby departing from the scope of the present invention.

Thanks to the characteristic of providing at least one arm of a structural node with an end portion having the aforesaid C-channel conformation, it is possible to produce various geometries of the frame, including frames with two beam elements constrained to each other by an angle of 45° and intended to be connected together with a single structural node at the ends defining the aforesaid angle.

Figure 6:
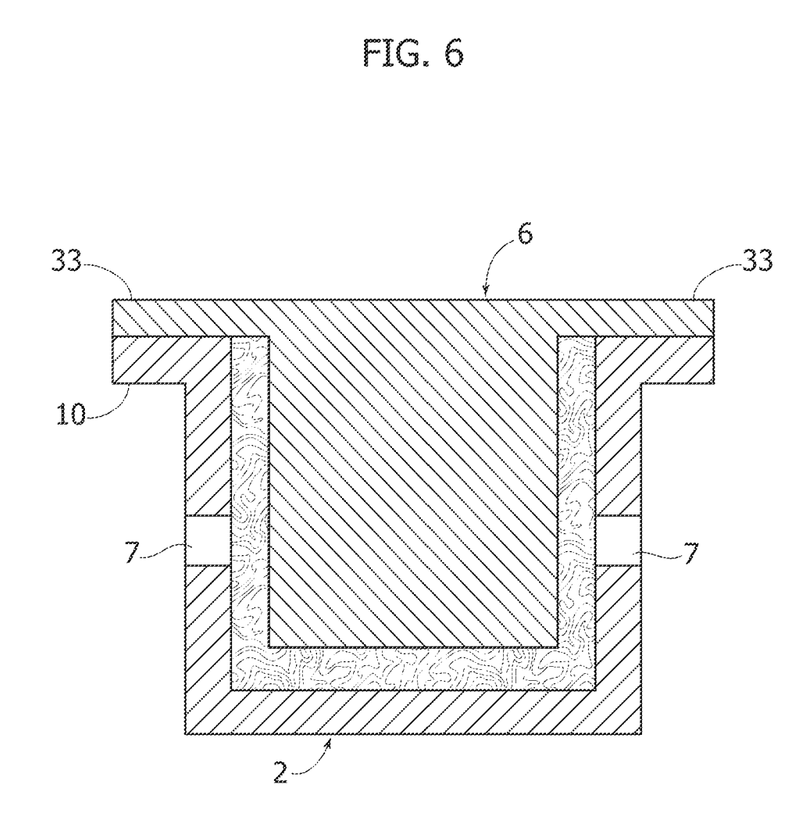
FIG. 6 is a schematic cross-sectional view of some components of the frame according to a variant with respect to what is shown in the previous figures.

According to a preferred characteristic of the invention, illustrated in the cross-sectional view of FIG. 6, the aforesaid C-channel shaped end portion includes two side flanges 10 each spaced along one side of the arm 2 at a respective side of the open cavity of the C-channel conformation, in such a way that the arm protruding from the central body 1 has an Ω-like cross-section at the aforesaid end portion.

Still referring to the cross-sectioned view of FIG. 6, the beam element 6, connected to the arm with an Ω-cross-section, also includes two end flanges 33 arranged in abutment against the side flanges 10 of the arm protruding from the central body 1 of the node, so as to define a free space between the inner surface of the hollow arm and the beam element inserted within the end portion with a C-channel conformation. It will therefore be appreciated that, in one embodiment, the adhesive layer inserted within the openings 7 spreads within the aforesaid free space formed between the inner surface of the hollow arm and the beam element inserted within the end portion with a C-channel conformation.

Figure 5:
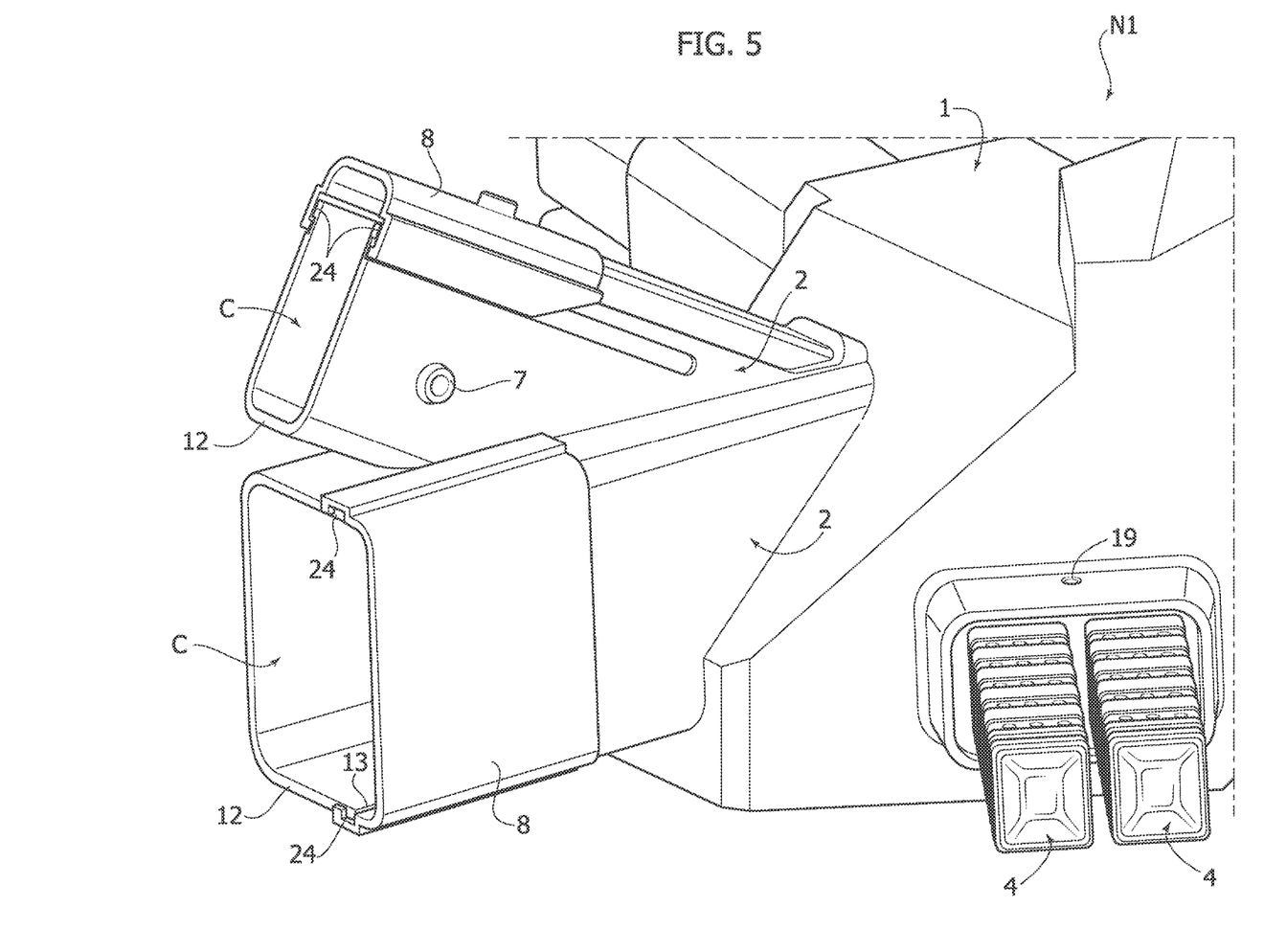

According to another preferred characteristic of the invention, illustrated in the perspective view of FIG. 5, the arm 2 including the C-channel conformation may include a rigid covering element 8 connected to the end portion of the arm 2 with a C-channel conformation. The rigid covering element 8 is spaced along at least one side of the arm above the aforesaid open cavity and above the beam element arranged within the cavity. Preferably, the covering element 8 is slidably mounted on respective guides 24, after the positioning of one end of the beam element 6 within the aforesaid cavity has occurred. The covering element 8 is configured to slide on the guides (for example, conical) and remain blocked with interference fit on the guides 24 and on the beam element 6. In this way, the beam element 6 is locked in position until the adhesive material is injected.

In the following description, various additional embodiments of the structural nodes will be described, to provide a lattice frame T of a motor-vehicle according to the present invention.

As illustrated in particular in FIGS. 2-4, one arm 3 of one of the nodes may have an end portion 14 arranged within the cavity of the hollow arm 3 and protruding in the opposite direction with respect to the central body 1 of the structural node. The end portion 14 is configured to be mounted with a respective hollow beam element 5, so that one end of the beam element 5, coupled with the structural node, is interposed between the walls of the hollow arm 3, and the end portion 14 protruding in a direction opposite to the central body 1.

The hollow beam element 5 may define several cavities 15 arranged side-by-side and separated from each other by at least one intermediate wall 16. In this case, the aforesaid end portion 14 arranged within the cavity of the hollow arm 3 defines respective protruding sectors divided by a free space 25, arranged to receive the intermediate wall 16 of the beam element 6 mounted with interference fit with the arm 3 of the structural node.

The attached drawings illustrate another embodiment of a structural node included in a lattice frame according to the present invention, in which at least one arm 4 can be connected by means of an adhesive material to a respective beam element 11, in such a way that the walls of the arm 4 are arranged within a respective end portion of the beam element 11. This arm 4 may include one or more inlet ports 19 for injecting the adhesive material, an axial supply channel 20 for the adhesive material, extending inside the arm 4 and a plurality of outlet ports 21 for the adhesive material (FIGS. 5, 7-9, 12).

Figure 7:
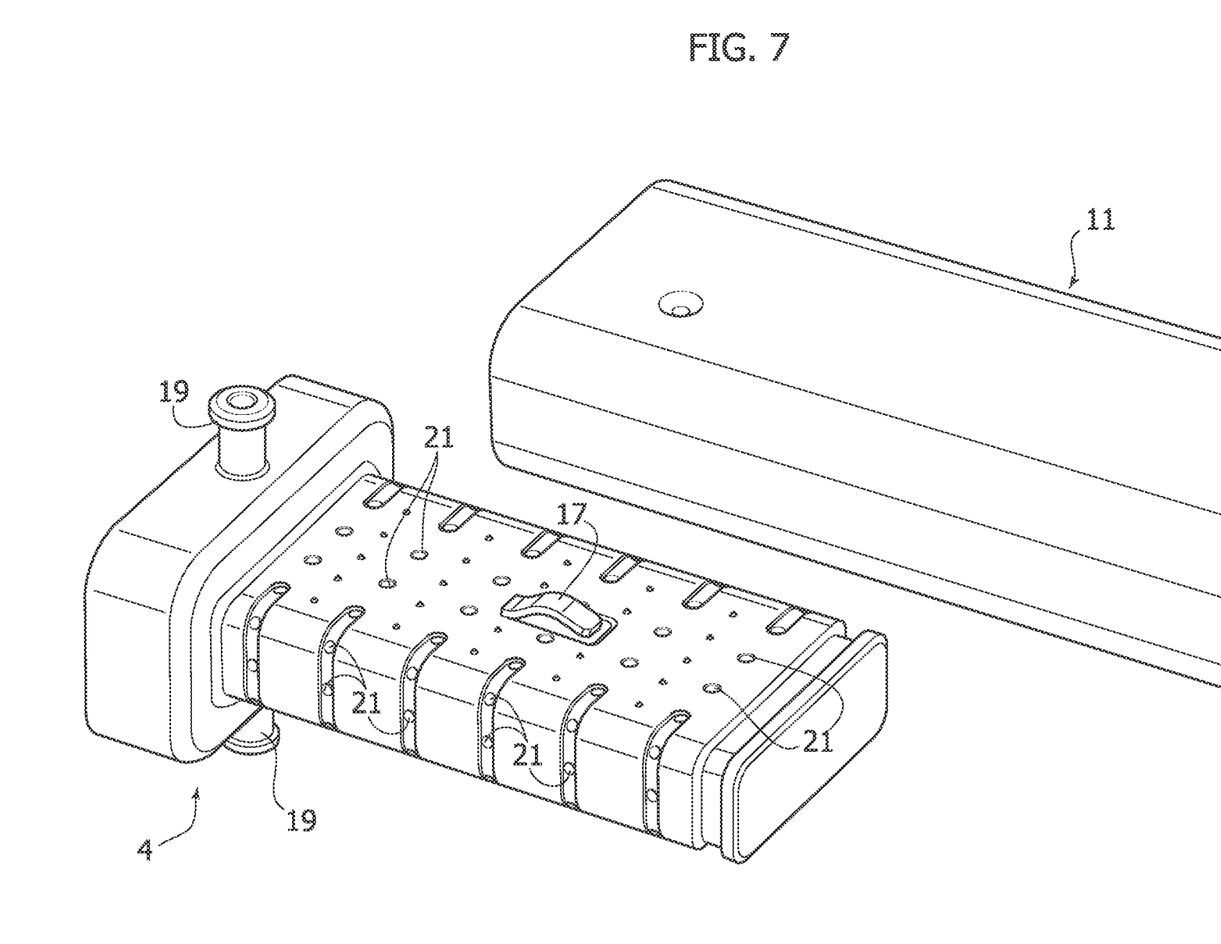
FIG. 7 illustrates an exploded perspective view of some components of the frame according to a further variant with respect to that shown in the previous figures.

The inlet ports 19 can be arranged near the central body of the node and can be made in the form of a pin, protruding from the walls that define the arm 4. As illustrated in the example of FIG. 7, there can be two inlet ports 19, protruding from two opposite sides of the arm 4.

Figure 8:
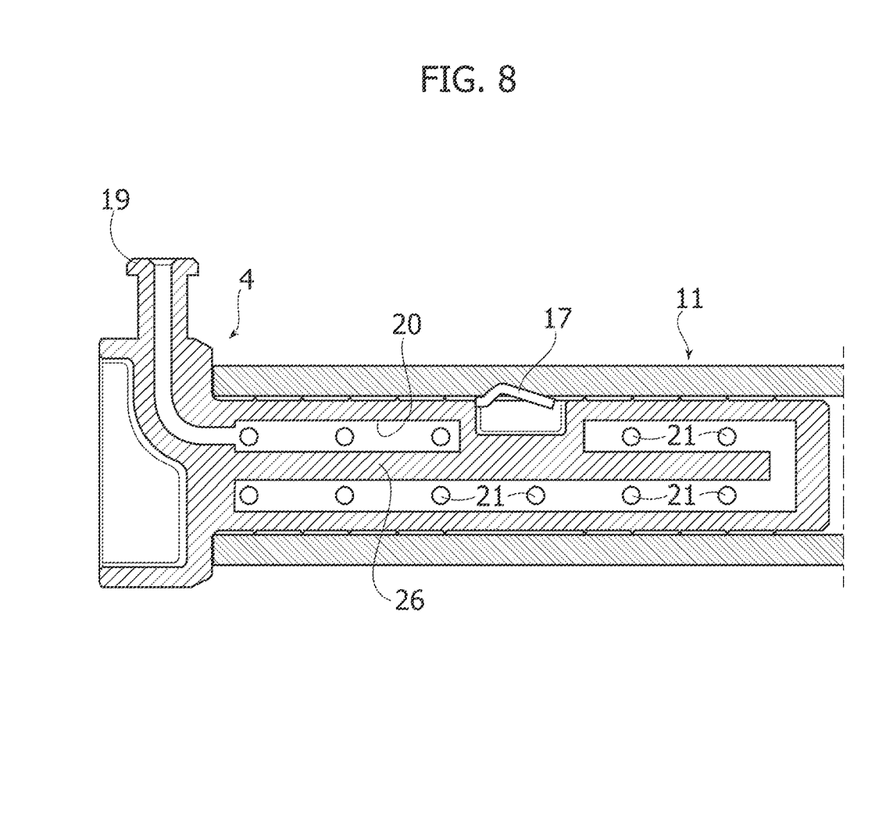
FIGS. 8-9 are cross-sectional views of the details shown in FIG. 7, in an assembled condition.
Figure 9:
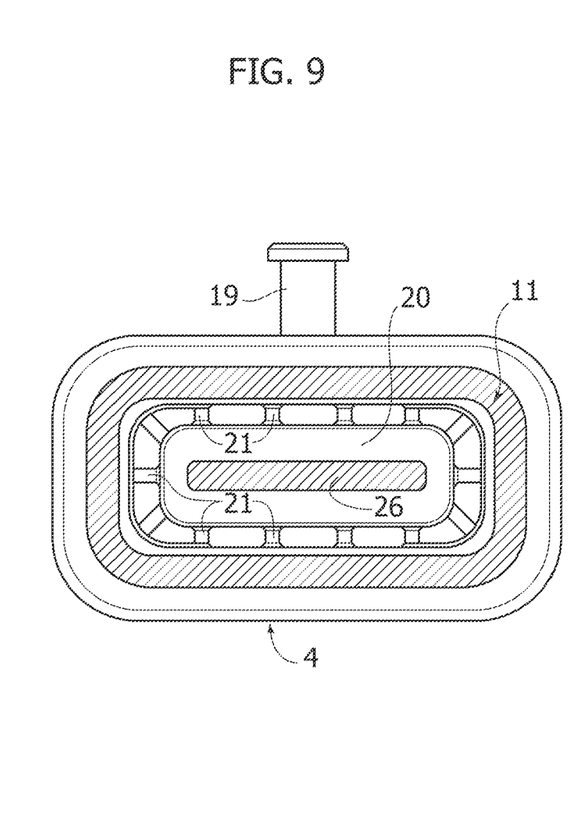

As illustrated in FIGS. 8, 9, the supply channel 20 has an inlet end, coinciding with the inlet port 19, and an overall extension corresponding to the length of the arm 4. In the case illustrated in FIGS. 8, 9, inside the arm 4, the channel 20 encloses an inner portion 26 of the arm 4, thus extending between the outer walls of the arm 4 and this inner portion 26.

The outlet ports 21 for the adhesive material can be constituted by holes formed through the walls of the arm 4, distributed along its extension and extending radially between the axial supply channel 20 of the adhesive material and the outer walls of the arm 4. Thanks to this characteristic, gluing of the arm 4 within the respective beam element 11 is made extremely effective and long-lasting, since a homogeneous distribution of the adhesive material is obtained along the entire extension of the arm 4.

According to another preferred characteristic illustrated in the drawings, the arm 4 of one of the nodes is connected to the respective hollow beam element 11, not only with the aid of an adhesive material, but also by means of a preliminary mechanical coupling. The preliminary mechanical coupling is achieved by connecting members, which can include an elastic arm 17 arranged on one side of the arm 4 and an opening 18 formed on one side of the beam element, in such a way that, in an assembled condition, the elastic arm 17 is coupled with the opening 18, thus creating a mechanical engagement between the arm 4 and the beam element 11.

Figure 12:
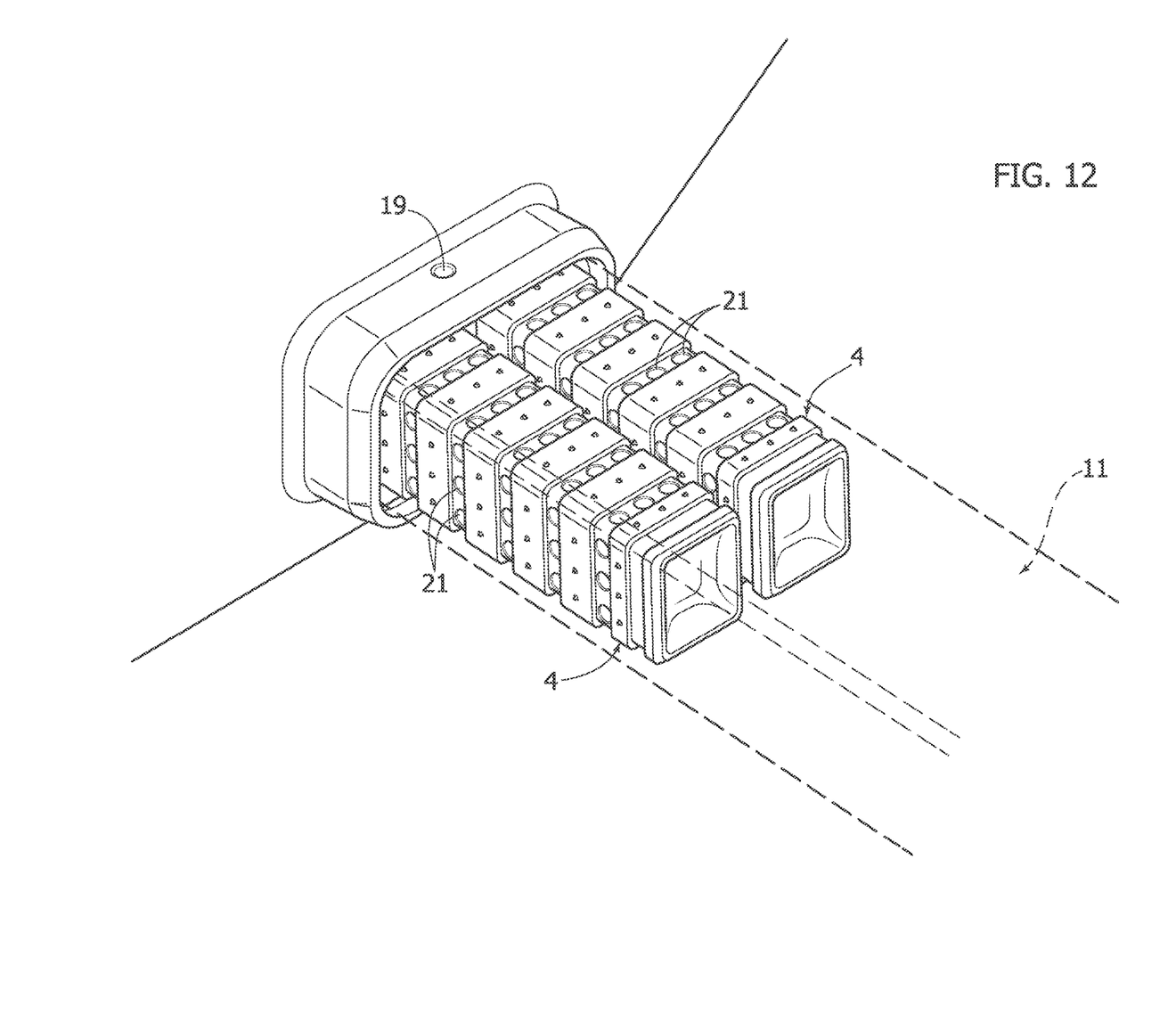
FIG. 12 illustrates a perspective view of a portion of a motor-vehicle lattice frame according to the invention.
Figure 13A:
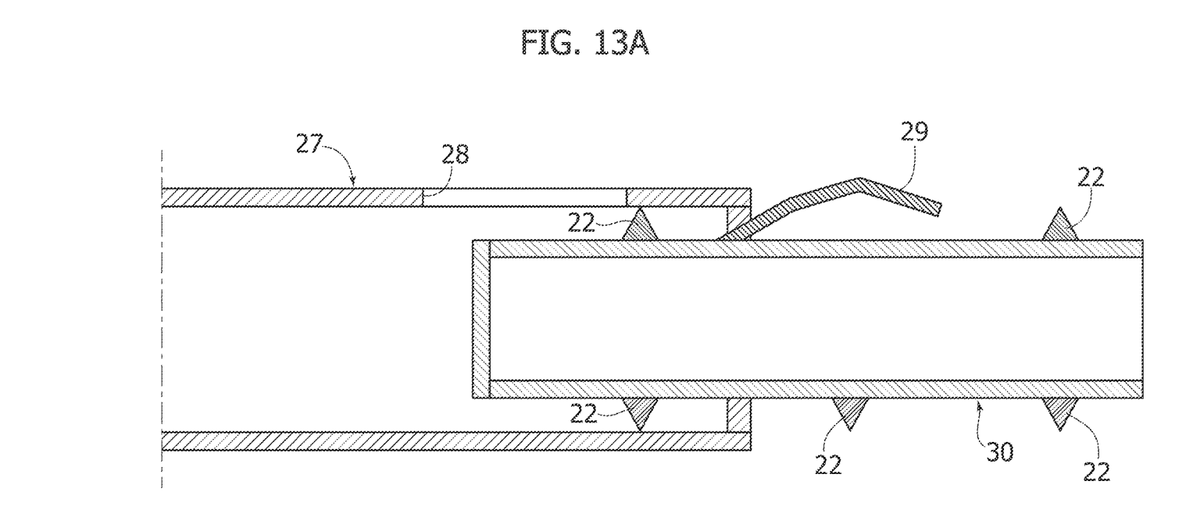
FIGS. 13A-13E illustrate assembly steps of some details of a motor-vehicle lattice frame according to the invention.
Figure 13B:
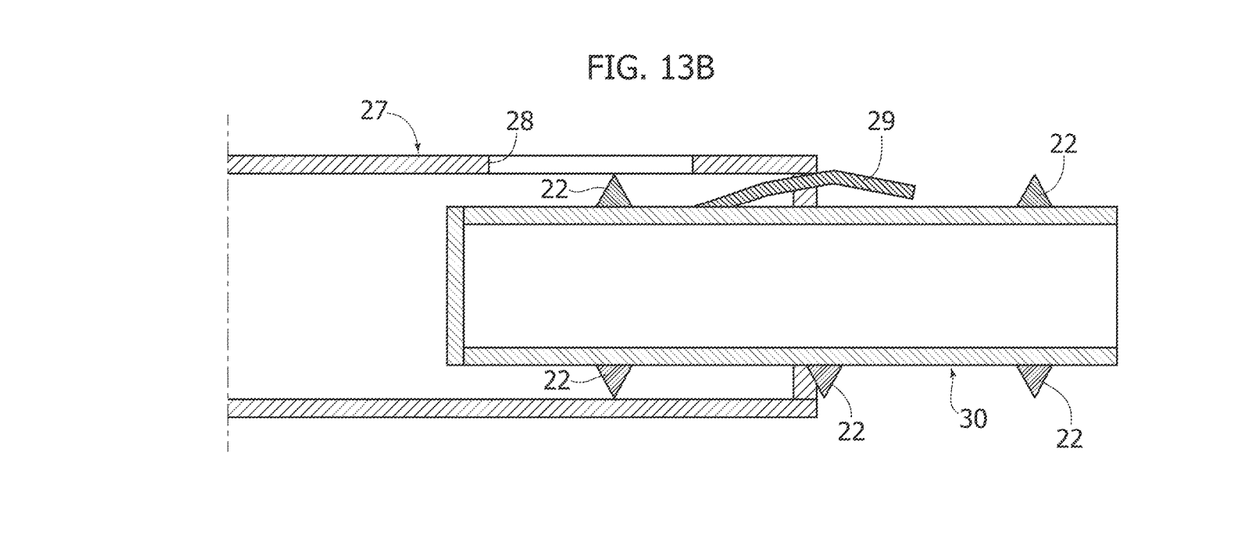
Figure 13C:
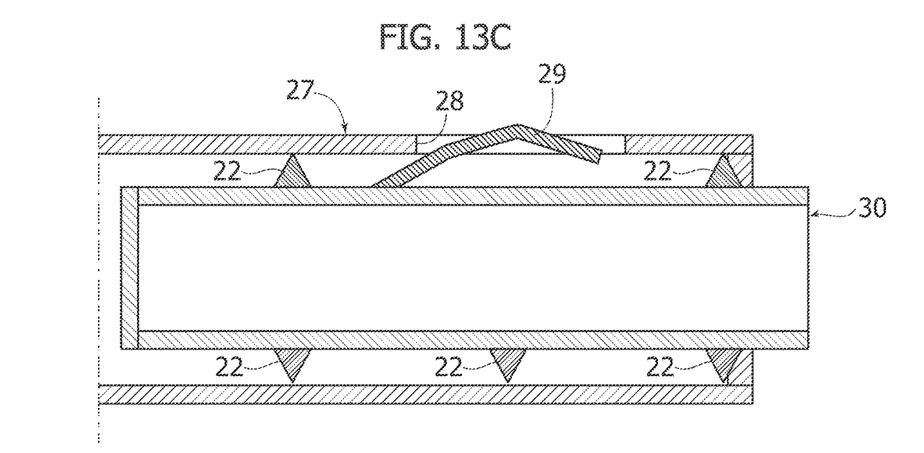
Figure 13D:
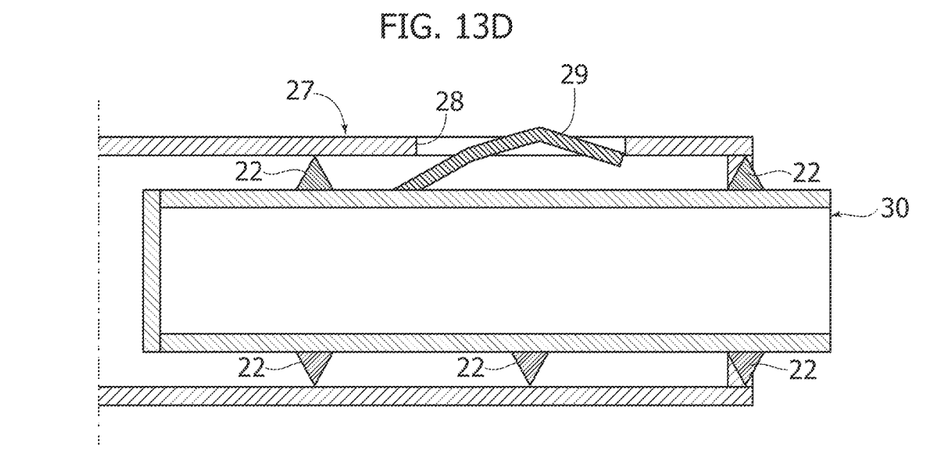
Figure 13E:
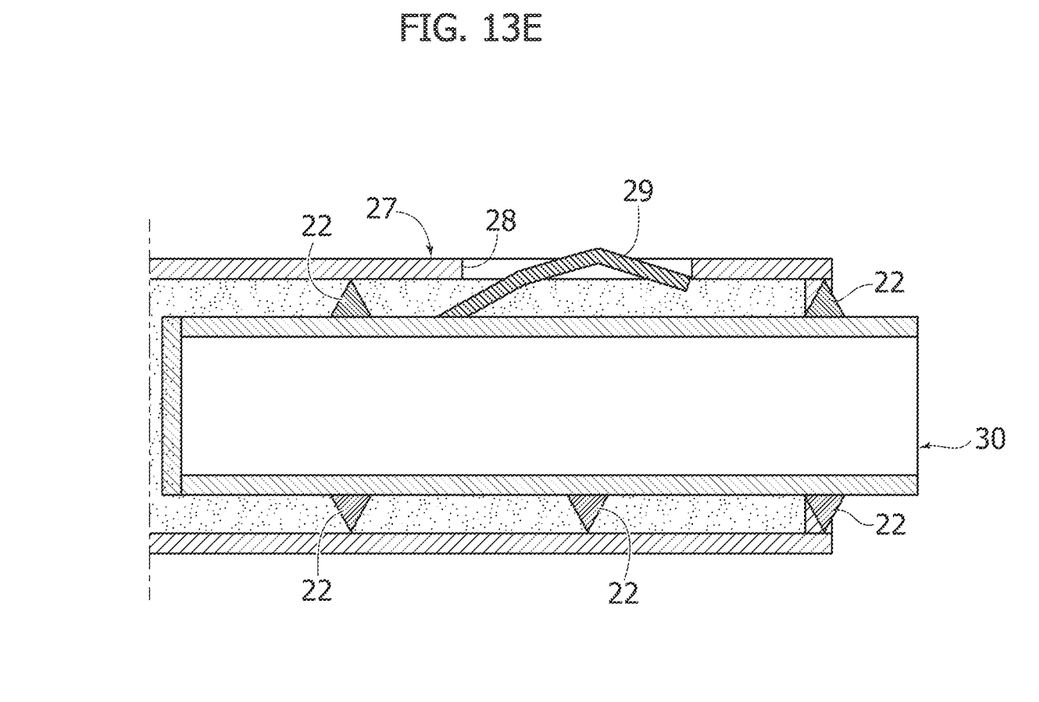

Preferably, at least one of the aforesaid arms 4 provided with the supply channel 20 and the holes constituting the outlet ports 21 is formed by a pair of arms 4 arranged side-by-side and configured to be mounted within a single beam element 11 (FIGS. 5, 12).

Figure 10:
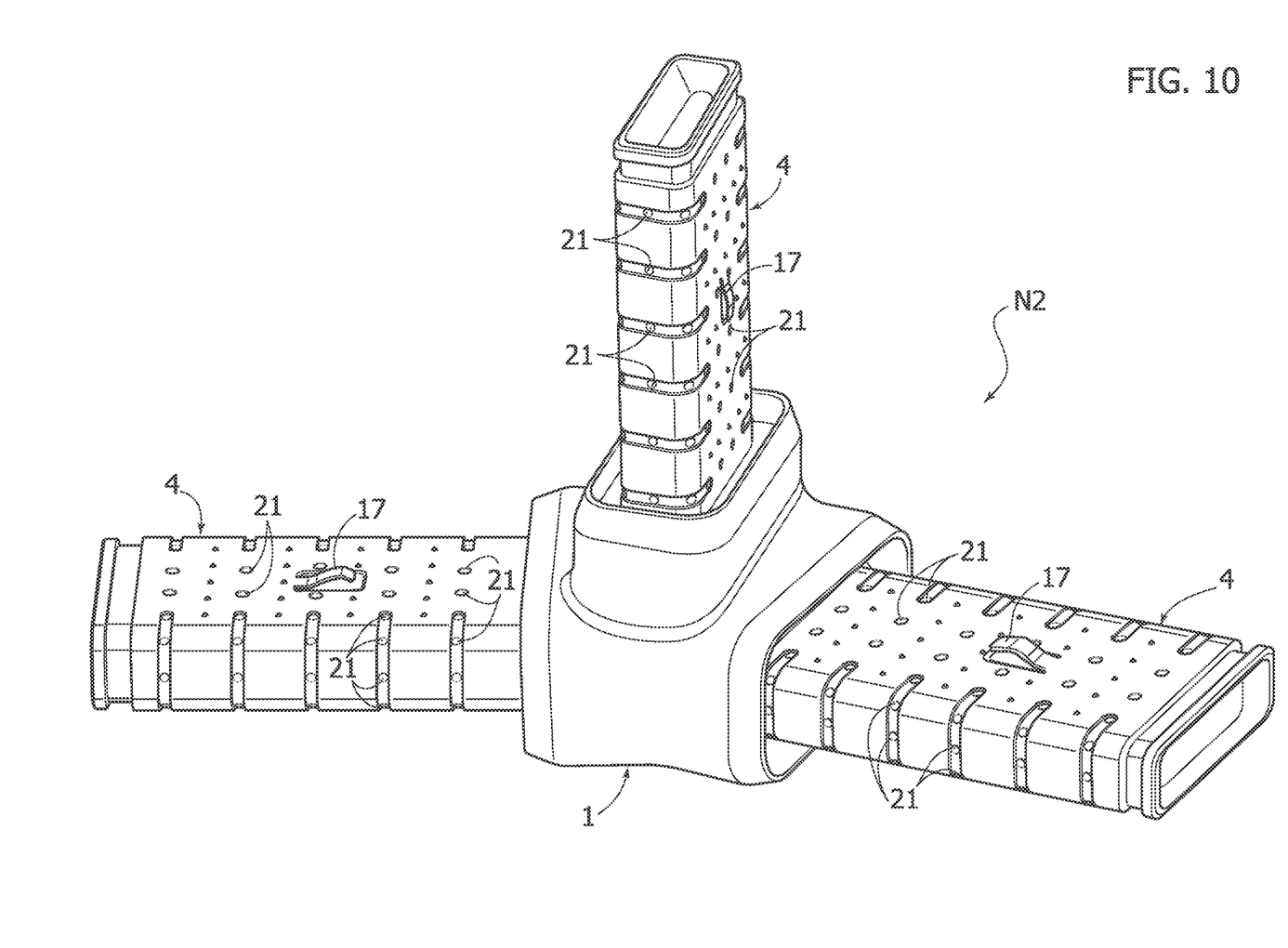
FIGS. 10 and 11 illustrate, respectively, a perspective view and a cross-sectioned perspective view of a part of a motor-vehicle lattice frame according to the invention.
Figure 11:
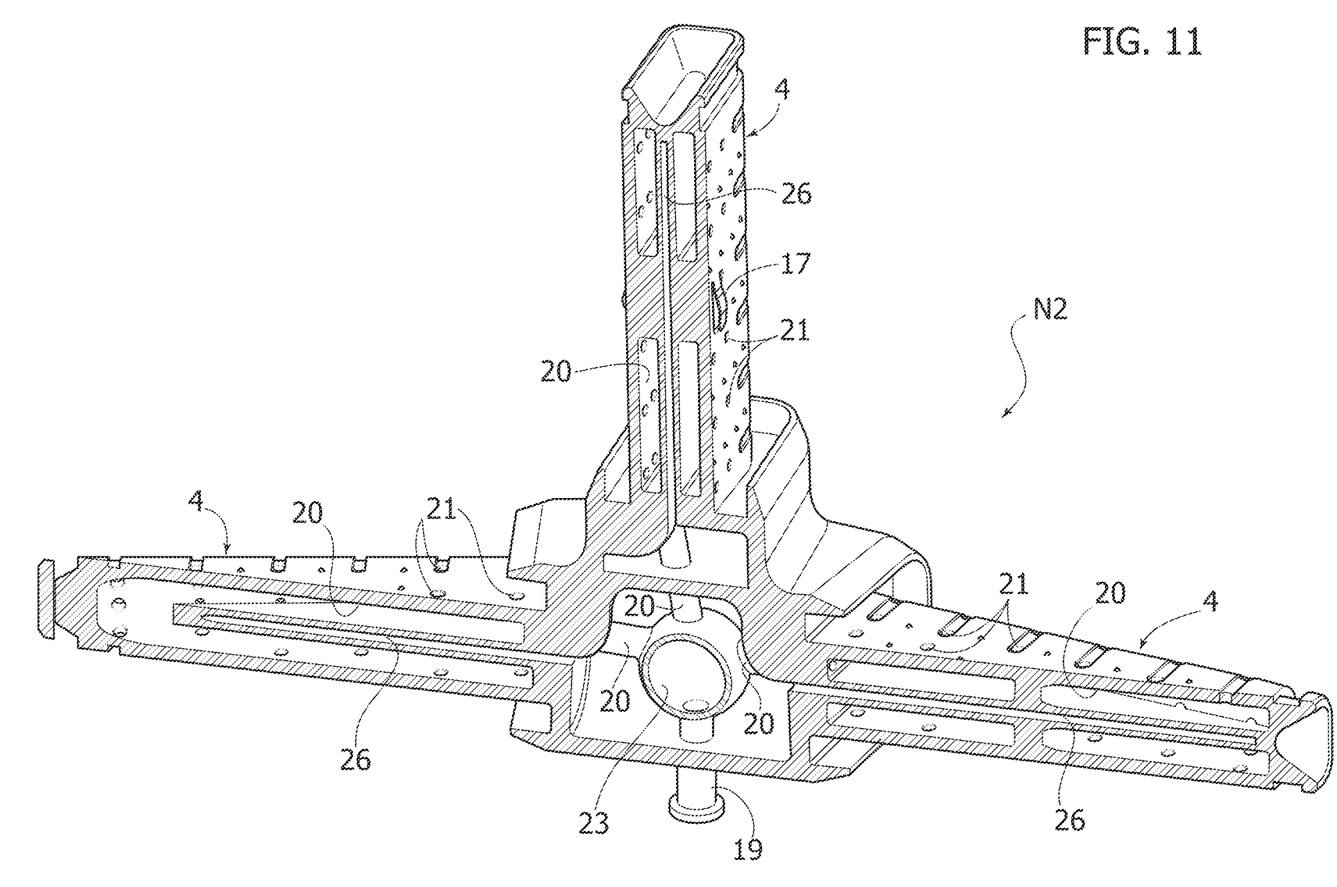

Preferably, at least one of the structural nodes N2 of the lattice frame T according to the invention comprises a plurality of the aforesaid arms 4 provided with the supply channel 20 and the holes constituting the outlet ports 21 (FIG. 10). In this case, the node N2 may comprise a single inlet port 19 for the adhesive material, communicating with a central chamber 23, located within the central body 1 of the node N2, from which the supply channels 20 of the respective arms 4 extend. Of course, the number of arms and their configuration can widely vary with respect to what is shown in FIGS. 10 and 11. For example, as well as the three arms 4 with an supply channel 20 illustrated in FIGS. 10 and 11, an arm 2 with a C-channel shape can be added, protruding from the same central body 1 from which the three arms 4 also protrude.

FIGS. 13A-13E illustrate some components constituting a further embodiment of a lattice frame according to the present invention, in which one arm 30 of a node is arranged within a beam element 27. The arm 30 is provided with a plurality of spacer elements 22 arranged along its extension, configured to define, in the assembled condition, a free space between the inner surface of the beam element 27 and the outer surface of the arm 30. The beam element 27 can be provided with one or more inlet ports (not shown in FIGS. 13A-13E), in which the adhesive material can be introduced, to flow within the aforesaid free space and to glue between the beam element 27 and the arm 30. Preferably the spacer elements 22 are conical in shape to allow passage of the adhesive layer into the free space, along the entire extension of the hollow arm 27.

Similar to that described above, the beam element 27 can have an opening 28 formed on one of its sides, configured to receive an elastic arm 29 arranged on one side of the arm 30, so as to provide a mechanical coupling between the arm 30 and the beam element 27.

It should therefore be observed that the motor-vehicle lattice frame according to the invention has a rapid and low-cost production and assembly process, without thereby being less effective in performing the functions for which it is designed.

Producing the nodes by means of an additive manufacturing constructive technique means it is possible to obtain numerous advantages with respect to traditional production methods, among which, preparing components with complex geometries without incurring penalties in terms of time or cost with respect to the production of components with more simple geometries.

Thanks to the characteristic of providing at least one arm of a structural node with an end portion having the aforesaid C-channel conformation, it is possible to produce various frame geometries, including frames with two beam elements constrained to each other by an angle of 45° and intended to be connected together with a single structural node at their ends defining the aforesaid angle.

Thanks to the characteristic of providing at least one arm of a structural node with outlet ports composed of holes formed through the walls of the arm, distributed along its extension and extending radially between the axial channel for supplying the adhesive material and the outer walls of the arm, gluing of the arm within the respective hollow beam element is made extremely effective and long-lasting, since a homogeneous distribution of the adhesive material along the entire length of the arm is ensured.

Of course, without prejudice to the principle of the invention, the details of construction and the embodiments may vary widely with respect to those described and illustrated purely by way of example, without departing from the scope of the present invention.

The invention claimed is:

1. A motor-vehicle lattice frame comprising:
   a plurality of structural nodes each having a central body and at least one hollow arm protruding from the central body,
   a plurality of beam elements connected to each other by means of said at least one hollow arm,
   said structural nodes made by an additive manufacturing technique and a first arm of said at least one hollow arm of one of the nodes having an end portion opposite to said central body having a channel shape with an open cavity both at a front end of the first arm and along one side of the first arm;
   said end portion having a channel-shaped conformation including two side flanges each extending along one side of the first arm, at a respective side of said open cavity; and
   wherein at least one beam element of said plurality of beam elements connected to said first arm, includes two end flanges arranged in abutment against said side flanges, so as to define a free space between the inner surface of the hollow arm and the beam element inserted into said channel-shaped end portion.

2. A motor-vehicle lattice frame according to claim 1, wherein said beam element is connected to said at least one arm with a channel-shaped end portion, only by means of the aid of an adhesive layer.

3. A motor-vehicle lattice frame according to claim 2, wherein said channel-shaped end portion includes two opposite side walls on which at least one opening is formed for the passage of the adhesive layer.

4. A motor-vehicle lattice frame according to claim 3, wherein said adhesive layer is diffused within said free space between the inner surface of the hollow arm and the beam element inserted within said channel-shaped end portion.

5. A motor-vehicle including at least one lattice frame according to claim 1.

6. A motor-vehicle lattice frame comprising:
- a plurality of structural nodes each having a central body and at least one hollow arm protruding from the central body;
- a plurality of beam elements connected to each other by means of said at least one hollow arm;
- said structural nodes made by an additive manufacturing technique and a first arm of said at least one arm of one of the nodes having an end portion opposite to said central body having a channel shape with an open cavity both at a front end of the first arm and along one side of the first arm; and
- wherein said first arm including a rigid covering element slidably mounted on said channel-shaped end portion and arranged along at least one side of the first arm above said open cavity and above the beam element arranged within the cavity, to lock the beam element.

* * * * *